United States Patent
Hass et al.

(10) Patent No.: US 10,841,284 B2
(45) Date of Patent: Nov. 17, 2020

(54) VEHICLE COMMUNICATION NETWORK AND METHOD

(71) Applicant: Lear Corporation, Southfield, MI (US)

(72) Inventors: William D. Hass, Ann Arbor, MI (US); Lars Wolleschensky, Ann Arbor, MI (US); Andre Weimerskirch, Ann Arbor, MI (US); David C. Bares, Northville, MI (US)

(73) Assignee: Lear Corporation, Southfield, MI (US)

( * ) Notice: Subject to any disclaimer, the term of this patent is extended or adjusted under 35 U.S.C. 154(b) by 238 days.

(21) Appl. No.: 15/992,919

(22) Filed: May 30, 2018

(65) Prior Publication Data

US 2019/0372944 A1 Dec. 5, 2019

(51) Int. Cl.
*H04L 29/06* (2006.01)
*G06F 21/57* (2013.01)

(52) U.S. Cl.
CPC ........ *H04L 63/0435* (2013.01); *G06F 21/575* (2013.01); *G06F 2221/034* (2013.01)

(58) Field of Classification Search
CPC .............. H04L 63/0435; G06F 21/575; G06F 2221/034; G06F 21/606
See application file for complete search history.

(56) References Cited

U.S. PATENT DOCUMENTS

| | | | |
|---|---|---|---|
| 8,775,784 B2 | 7/2014 | Diluoffo et al. | |
| 9,792,440 B1* | 10/2017 | Wang | H04L 63/1466 |
| 10,009,325 B1* | 6/2018 | David | H04L 9/0866 |
| 10,723,361 B2* | 7/2020 | Imamoto | H04L 63/1408 |
| 2009/0222910 A1* | 9/2009 | Le Bihan | G06F 21/445 726/19 |
| 2017/0111177 A1* | 4/2017 | Oguma | H04L 67/12 |
| 2018/0183605 A1* | 6/2018 | Kawabata | B60R 16/02 |
| 2018/0189103 A1* | 7/2018 | Teshler | H04L 67/12 |
| 2019/0028267 A1* | 1/2019 | Takemori | G09C 1/00 |
| 2019/0049912 A1* | 2/2019 | Poornachandran | G06F 11/2033 |
| 2019/0190899 A1* | 6/2019 | Wilmer | G01C 22/025 |
| 2019/0199524 A1* | 6/2019 | Takemori | H04L 9/0861 |

(Continued)

OTHER PUBLICATIONS

Lebedev, Ilia et al., "Secure Boot and Remote Attestation in the Sanctum Pocessor", 2018 IEEE 31st Computer Security Foundations Symposium (CSF), Oxford, 2018, pp. 46-60. (Year: 2018).*

(Continued)

*Primary Examiner* — Michael Pyzocha
(74) *Attorney, Agent, or Firm* — Fishman Stewart PLLC (57) ABSTRACT

A method of communicating via a vehicle communication network includes providing an electronic control unit (ECU), the ECU including a main processing unit and a security processing unit, the security processing unit including a symmetric security key, attempting a secure boot of the main processing unit, providing use of the symmetric security key to the main processing unit if the secure boot of the main processing unit is successful, preventing use of the symmetric security key by the main processing unit if the secure boot of the main processing unit is not successful, conducting, via an attestation processing unit, a remote attestation of the main processing unit, and determining, via the attestation processing unit, whether the secure boot of the main processing unit was successful according to the remote attestation.

20 Claims, 4 Drawing Sheets

(56) References Cited

U.S. PATENT DOCUMENTS

2019/0347421 A1\* 11/2019 Takemori ............... G07C 5/008
2020/0134186 A1\* 4/2020 Hong .................... H04W 12/10

OTHER PUBLICATIONS

Jaeson Yoo, "Security for Connected/Autonomous Car" (https://www.itu.int/en/ITU-T/Workshops-and-Seminars/201708/Documents/S3-Yoo.pdf), dated Sep. 2017.

Hisashi Oguma et al, "New Attestation-Based Security Architecture for In-vehicle Communication" (https://pdfs.semanticscholar.org/3ed6/ aebc854afbf572d174f5b8bb0424906f7fda.pdf).

Christian Meves, et al., "A Security Architecture for Multipurpose ECUs in Vehicles" (https://www.evita-project.org/Publications/SMWW09.pdf).

Karim Eldefrawy et al., "Remote Attestation of Heterogeneous Cyber Physical Systems" (http://www.ics.uci.edu/~gts/paps/attest-ESCAR15.pdf).

Christian Schleiffer, et al, Secure Key management—a Key Feature for Modern Vehicle Electronics.

\* cited by examiner

VEHICLE COMMUNICATION NETWORK AND METHOD

TECHNICAL FIELD

The present disclosure generally relates to vehicle communication networks and vehicle communication methods.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Vehicle communication networks continue to become more advanced and powerful.

Protecting vehicle communication networks from unauthorized access and detecting unauthorized access continues to become more important. Some systems may involve asymmetric keys, but asymmetric keys may not be as efficient and/or as effective as symmetric security keys. Determining a status of one or more components of a network from a remote location (e.g., from another location in a vehicle or from outside a vehicle) may be desirable.

There is a desire for solutions/options that minimize or eliminate one or more challenges or shortcomings of vehicle communication networks and methods. The foregoing discussion is intended only to illustrate examples of the present field and should not be taken as a disavowal of scope.

SUMMARY

In embodiments, a method of communicating via a vehicle communication network may include providing an electronic control unit (ECU). An ECU may include a main processing unit and/or a security processing unit. A security processing unit may include a symmetric security key. The method may include attempting a secure boot of the main processing unit, providing use of the symmetric security key to the main processing unit if the secure boot of the main processing unit is successful, preventing use of the symmetric security key by the main processing unit if the secure boot of the main processing unit is not successful, conducting, via an attestation processing unit, a remote attestation of the main processing unit, and/or determining, via the attestation processing unit, whether the secure boot of the main processing unit was successful according to the remote attestation. Conducting the remote attestation may include the attestation processing unit sending a request for a computation using the symmetric security key to the main processing unit, determining that the main processing unit has completed the secure boot if the main processing unit provides a correct result of the computation involving the symmetric security key in response to the request, and/or determining that the main processing unit is not secure if the main processing unit does not provide the correct result of the computation involving the symmetric security key in response to the request.

With embodiments, the main processing unit may be configured to use services of the security processing unit, and/or the main processing unit and the security processing unit may be configured such that the main processing unit cannot read data directly from the security processing unit. The ECU may be configured as a gateway ECU. The symmetric security key may be stored in a memory of the security processing unit. The memory may include boot protection. Providing use of the symmetric security key to the main processing unit may not include providing the symmetric security key to the main processing unit. The ECU may be disposed in a vehicle and the attestation processing unit may be a remote processing unit disposed outside of the vehicle.

In embodiments, a method of communicating via a vehicle communication network may include providing a second ECU. The second ECU may include a second main processing unit and a second security processing unit. The second ECU may be configured to control operation of a vehicle system. The second ECU may include a second symmetric security key. A method of communicating via a vehicle communication network may include attempting a secure boot of the second main processing unit, providing use of the second symmetric security key from the second security processing unit to the second main processing unit if the secure boot of the second main processing unit is successful, preventing use of the second symmetric security key by the second main processing unit if the secure boot of the second main processing unit is not successful. Conducting a remote attestation may include the attestation processing unit sending a second request for a second computation using the second symmetric security key to the second main processing unit, determining that the second main processing unit has completed the secure boot if the second main processing unit provides a correct result of the second computation involving the second symmetric security key in response to the second request, and/or determining that the second main processing unit is not secure if the second main processing unit does not provide the correct result of the second computation involving the second symmetric security key in response to the second request. A method of communicating via a vehicle communication network may include determining, via the ECU, whether the secure boot of the second main processing unit was successful.

With embodiments, a method of communicating via a vehicle communication network may not involve asymmetric security keys. A remote attestation may not include communicating the symmetric security key to the attestation processing unit. A security processing unit may be secure hardware extension compliant. A method of communicating via a vehicle communication network may include providing a plurality of secondary ECUs. The secondary ECUs may each include a secondary main processing unit and a secondary security processing unit associated with the secondary main processing unit. Each secondary ECU may be configured to control operation of a respective vehicle system of a plurality of vehicle systems. Each secondary ECU may include a respective symmetric security key. A method of communicating via a vehicle communication network may include attempting a secure boot of the secondary main processing unit of at least two of the plurality of secondary ECUs, providing, for each secondary main processing unit that successfully completed the secure boot, use of the respective security key of the associated security processing unit, and/or preventing, for each secondary main processing unit that failed to successfully complete the secure boot, use of the respective security key of the associated security processing unit. The symmetric security key of the ECU and all of the respective symmetric security keys of the secondary ECUs may be different from each other. The plurality of vehicle systems may include a brake system, a transmission, and/or an infotainment system. The remote attestation may be conducted at least one of periodically and with vehicle start.

In embodiments, a vehicle communication network may include an electronic control unit (ECU) disposed in a vehicle. The ECU may include a main processing unit configured for a secure boot and a security processing unit including a symmetric security key. The security processing unit may be configured to (i) provide use of the symmetric security key to the main processing unit if the secure boot of the main processing unit is successful, and/or (ii) prevent use of the symmetric security key by the main processing unit if the secure boot of the main processing unit is not successful. A vehicle communication network may include an attestation processing unit configured to conduct a remote attestation of the main processing unit and configured to determine whether the secure boot of the main processing unit was successful according to the remote attestation. Conducting the remote attestation may include the attestation processing unit sending a request for a computation using the symmetric security key to the main processing unit, determining that the secure boot of the main processing unit was successful if the main processing unit provides a correct result of the computation involving the symmetric security key in response to the request, and/or determining that the main processing unit is not secure if the main processing unit does not provide the correct result of the computation involving the symmetric security key in response to the request. A vehicle communication network may include a plurality of secondary ECUs. The secondary ECUs may each include a secondary main processing unit and a secondary security processing unit associated with the secondary main processing unit. Each secondary ECU may be configured to control operation of a respective vehicle system of a plurality of vehicle systems. Each secondary security processing unit may include a respective symmetric security key. Each secondary security processing unit may be configured to provide use of the respective security key to the secondary main processing unit associated with the secondary security processing unit only if the secondary main processing unit associated with the secondary security processing unit completes a secure boot.

With embodiments, a method of vehicle communication may include detecting, via an anomaly detection system, that an anomaly is present in a communication network of a vehicle, determining, via the anomaly detection system, that an electronic control unit (ECU) is responsible for the anomaly, the ECU including a main processing unit and a security processing unit, the security processing unit including a symmetric security key, attempting a secure boot of the main processing unit, providing use of the symmetric security key from the security processing unit to the main processing unit if the secure boot of the main processing unit is successful, preventing use of the symmetric security key by the main processing unit if the secure boot of the main processing unit is not successful, conducting, via an attestation processing unit, a remote attestation of the main processing unit, and/or determining, via the attestation processing unit, whether the secure boot of the main processing unit was successful according to the remote attestation. Conducting the remote attestation may include the attestation processing unit sending a request for a computation using the symmetric security key to the main processing unit, determining that the secure boot of the main processing unit was successful if the main processing unit provides a correct result of the computation involving the symmetric security key in response to the request, and/or determining that the secure boot of the main processing unit was not successful if the main processing unit does not provide the correct result of the computation involving the symmetric security key in response to the request.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
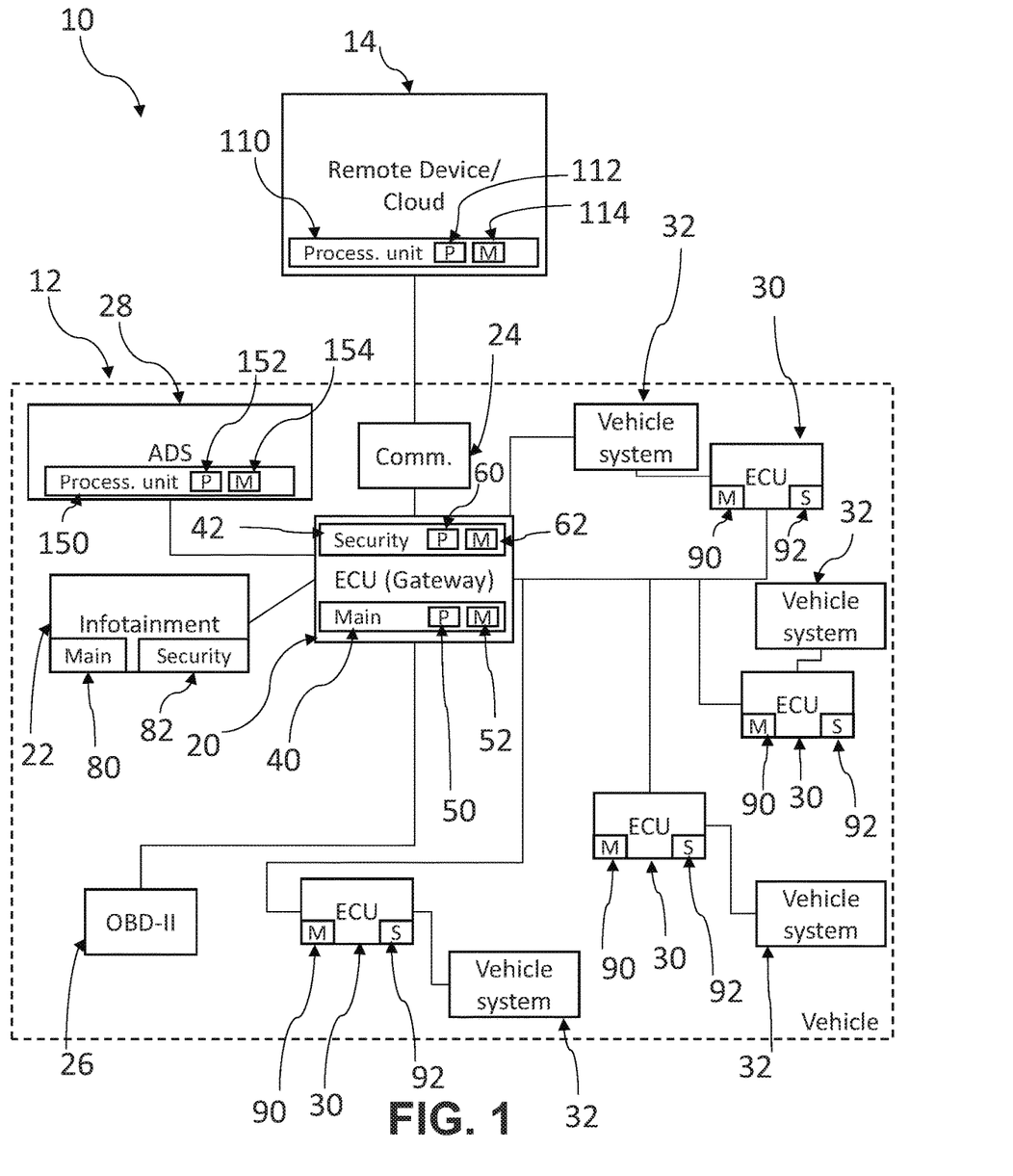
FIG. 1 is a schematic view generally illustrating an embodiment of a vehicle communication network according to teachings of the present disclosure.

In embodiments, such as generally illustrated in FIG. 1 a vehicle communication network 10 may include a vehicle 12 and/or a remote electronic device 14 that may be in communication with the vehicle 12. With embodiments, a vehicle 12 may include an electronic control unit (ECU) 20, an infotainment system 22, a communication unit 24, an OBD-II port/bus 26, an anomaly detection system 28, one or more secondary ECUs 30, and/or one or more vehicle systems 32.

In embodiments, an ECU 20 may be configured as a gateway ECU and may be configured to communicate with one of more of the infotainment system 22, the communication unit 24, the OBD-II port/bus 26, the anomaly detection system 28, and/or some or all other ECUs 30. An ECU 20 may include and/or be connected to the communication unit 24. A communication unit 24 may be configured to communicate via wired and/or wireless connections. For example and without limitation, a communication unit 24 may be configured to communicate via WiFi, cellular networks, local area networks (LAN), wireless local area networks (WLAN), wide area networks (WAN), controller area networks (CAN), dedicated short range communication (DSRC), personal area networks (PAN) Bluetooth®, radio networks, and/or other types of communication. A communication unit 24 may include, for example, a wireless communication receiver, transmitter, and/or transceiver. An ECU 20 may include and/or be connected to an anomaly detection system 28 and/or one or more vehicle systems 32.

With embodiments, an ECU may include a main processing unit 40 and a security processing unit 42 that may be configured to communicate with each other.

In embodiments, a main processing unit 40 may include a main processor 50 and a main memory 52. The main processing unit 40 may be configured for a secure boot or startup process. A secure boot process may include a processor, such as the main processor 50, analyzing one or more portions of (e.g., files or portions of code stored on) a memory, such as the main memory 52. For example and without limitation, the main processor 50 may check for valid security signatures or certificates and/or may check an trusted list or whitelist. A secure boot process may prevent malicious code or software (e.g., a bootkit) from running on a processing unit. The main processing unit 40 may be configured to communicate with and/or control one or more secondary ECUs 30 and/or vehicle systems 32.

Figure 2:
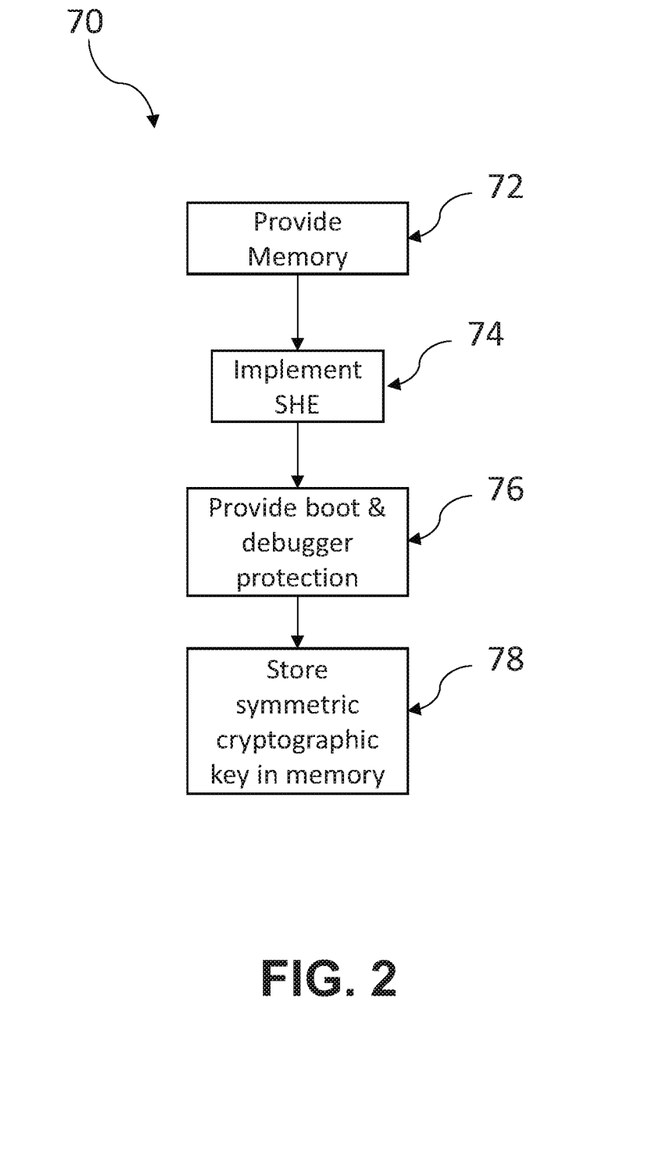
FIG. 2 is a flow diagram of an embodiment of a vehicle communication method, including storing security keys, according to teachings of the present disclosure.

With embodiments, a security processing unit 42 may include a security processor 60 and/or a security memory 62. The security memory 62 may provide secure storage, such as via the Secure Hardware Extension (SHE) specification. The security memory 62 may include boot protection and/or debugger protection. With embodiments, such as generally illustrated in connection with the method of FIG. 2, one or more security keys (e.g., digital/electronic security keys) may be stored in the security memory 62. For example and without limitation, the security memory 62 may include a symmetric security key. A method 70 of storing a security key may include providing a memory (step 72), such as the security memory 62. The memory may be configured according to the SHE specification (step 74) and may be provided with boot protection and/or debugger protection (step 76). The one or more security keys may be stored in the memory, such as the security memory 62 (step 78). The one or more security keys may include symmetric keys. The security processing unit 42 may be configured to communicate with and/or monitor the main processing unit 40. For example and without limitation, the security processing unit 42 may be configured to determine if the main processing unit 40 has successfully completed a secure boot. If the security processing unit 42 determines that the main processing unit 40 has successfully completed a secure boot, the security processing unit 42 may provide use of the one or more security keys to the main processing unit 40. If the security processing unit 42 determines that the main processing unit 40 has not successfully completed a secure boot, the security processing unit 42 may prevent use of the one or more security keys by the main processing unit 40. In embodiments, a security processing unit 42 may be configured as and/or include a hardware security module (HSM). The security processing unit 42 may, under certain circumstances, provide use of a security key to other components. The security processing unit 42 may not transmit security keys and may not allow modification of security keys. The main processing unit 40 may not be configured to directly access any data of the security processing unit 42.

With embodiments, an infotainment system 22 may include a main processing unit 80 and/or a security processing unit 82. A main processing unit 80 and a security processing unit 82 of an infotainment system 22 may be configured in a similar or the same manner as the main processing unit 40 and the security processing unit 42 of the ECU 20, respectively (e.g., may include a main processor, a main memory, a security processor, and a security memory).

With embodiments, a secondary ECU 30 may be configured to control one or more vehicle systems 32. Vehicle systems 32 may include, for example and without limitation, a brake system/module, a transmission, a body control system, an infotainment system, a steering system, and/or a suspension system, among others. A secondary ECU 30 may include a main processing unit 90 and/or a security processing unit 92. Main processing units 90 and security processing units 92 of secondary ECUs 30 may be configured in a similar or the same manner as the main processing unit 40 and the security processing unit 42 of the ECU 20, respectively (e.g., may include respective main processors, main memory, security processors, and security memory).

In embodiments, a remote electronic device 14 may be configured to communicate, directly or indirectly, with a vehicle 12, such as with an ECU 20, an infotainment system 22, a communication device 24, one or more secondary ECUs 30. The remote electronic device 14 may include a remote processing unit 110 that may include a remote processor 112 and/or a remote memory 114. The remote electronic device 14 may be disposed outside of the vehicle 12 and/or may not be physically connected to the vehicle 12. For example and without limitation, the remote electronic device 14 may be disposed at a remote monitoring station that may be monitored by a monitoring service and/or by vehicle or component manufacturers.

Figure 3:
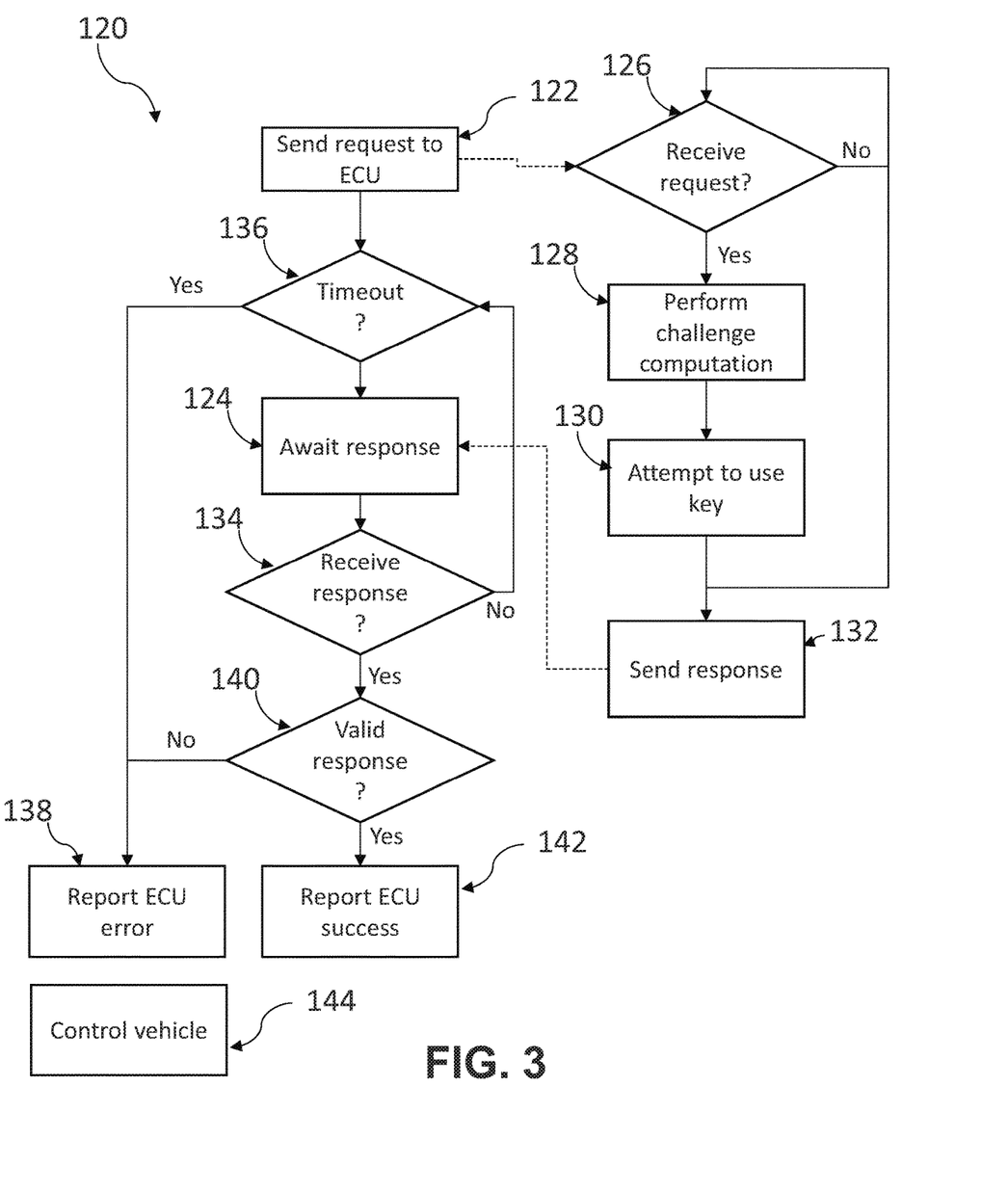
FIG. 3 is a flow diagram of an embodiment of a vehicle communication method, including remote attestation, according to teachings of the present disclosure.

With embodiments, the remote processing unit 110 may be configured to conduct a remote attestation of one or more ECUs (e.g., ECUs 20, 30) of a vehicle 12. Remote attestation may include evaluating a main processing unit of the ECU (e.g., main processing units 40, 90). The remote processing unit 110 may conduct a remote attestation to determine if a secure boot of a processing unit, such as main processing unit 40, was successful. With embodiments, such as generally illustrated in FIG. 3, a remote attestation method 120 may include the remote processing unit 110 sending a request (e.g., an electronic request/challenge) for a computation to the main processing unit 40 (step 122). Determining/generating a valid response to the requested computation may require the one or more security keys stored in the security processing unit 42. For example and without limitation, the main processing unit 40 may only provide a correct result of the requested computation if the main processing unit 40 successfully completes a secure boot and the security processing unit 42 provides use of the one or more security keys to the main processing unit 40. The remote processing unit 110 may await a response from the main processing unit 40 (step 124).

In embodiments, an ECU (e.g., ECU 20) may receive the request/challenge (step 126). The ECU 20 may attempt to perform a requested computation and/or generate a response to a challenge (step 128). Performing the requested computation and/or generating a response may involve and/or require access to a security key that may be stored in a security processing unit 42. If the main processing unit 40 of the ECU 20 has completed a secure boot, the main processing unit 40 may attempt to perform the requested computation (step 128) and the security processing unit 42 may provide use of the security key to the main processing unit 40 (step 130), which may allow the main processing unit 40 to successfully perform the requested computation and/or send a valid response to the challenge (step 132). If the main processing unit 40 of the ECU 20 has not completed a secure boot, the security processing unit 42 may not provide use of the security key to the main processing unit 40, which may prevent the main processing unit 40 from performing the requested computation and/or from generating a valid response to the challenge. If the main processing unit 40 does not successfully use the security key (step 130), the main processing unit 40 may provide an invalid response (step 132) to the remote processing unit 110 and/or may not provide a response.

With embodiments, if the remote processing unit 110 does not receive a response within a certain amount of time, a timeout may occur (step 136) and the remote processing unit 110 may indicate that an error has occurred and/or that the main processing unit 40 has not completed a secure boot (step 138). If the remote processing unit 110 receives a timely response from the main processing unit 40 (step 134), the remote processing unit 110 may determine if the response if valid (step 140). The remote processing unit 110 may be configured to determine that the main processing unit 40 has completed a secure boot if the main processing unit 40 provides a correct result of the computation involving the symmetric security key in response to the request (step 142). Additionally or alternatively, the remote processing unit 110 may be configured to determine that the main processing unit 40 has not completed a secure boot if the main processing unit 40 does not provide the correct result of the computation involving the symmetric security key in response to the request. If the main processing unit 40 does not provide the correct result of the computation involving the symmetric security key in response to the request, the remote processing unit 110 may indicate that an error has occurred and/or that the main processing unit 40 has not completed a secure boot (step 138).

In embodiments, indicating that an error has occurred and/or that the main processing unit 40 has not completed a secure boot (step 138) may include logging the failure in a log (e.g., of the ECU conducting the remote attestation), providing indication of an error to an occupant of the vehicle 12, and/or communicating with an external receiver (e.g., a monitoring company, vehicle manufacturer, component supplier, emergency services, etc.). If an ECU 20, 30 or system 22, 32 is determined to have failed to complete a secure boot, a remote processing unit 110 and/or a gateway ECU 20 may be configured to control (e.g., dictate, modify, limit, etc.) operation of a vehicle 12 (step 144). For example and without limitation, a remote processing unit 110 and/or a gateway ECU 20 may be configured to cause the vehicle 12 to transition to a safe mode, shut down a vehicle system controlled by a failed ECU, and/or cause the vehicle 12 to shut down.

With embodiments, remote attestation may not include the transmission of any security keys. For example and without limitation, a security processing unit 42 providing use of a symmetric security key to a main processing unit 40 may not include providing the symmetric security key or a copy thereof to the main processing unit 40.

In embodiments, an ECU 20 may be configured to conduct a remote attestation of one or more other ECUs 30 or systems 32. For example and without limitation, an ECU 20 may be configured to conduct a remote attestation of one or more secondary ECUs 30 and/or the infotainment system 22. Additionally or alternatively, a secondary ECU 30 may be configured to conduct a remote attestation of another secondary ECU 30 and/or of ECU 20 (e.g., a gateway ECU).

In embodiments, a remote attestation may be initiated (e.g., by a remote processing unit 110 and/or an ECU 20, 30) according to one or more of a variety of factors, events, and/or occurrences. For example and without limitation, a remote processing device 14 may initiate a remote attestation on-demand, upon ignition/start of a vehicle 12, upon key-on of a vehicle 12, according to a schedule, according to an interval or period, and/or if an anomaly is detected, among other things.

Figure 4:
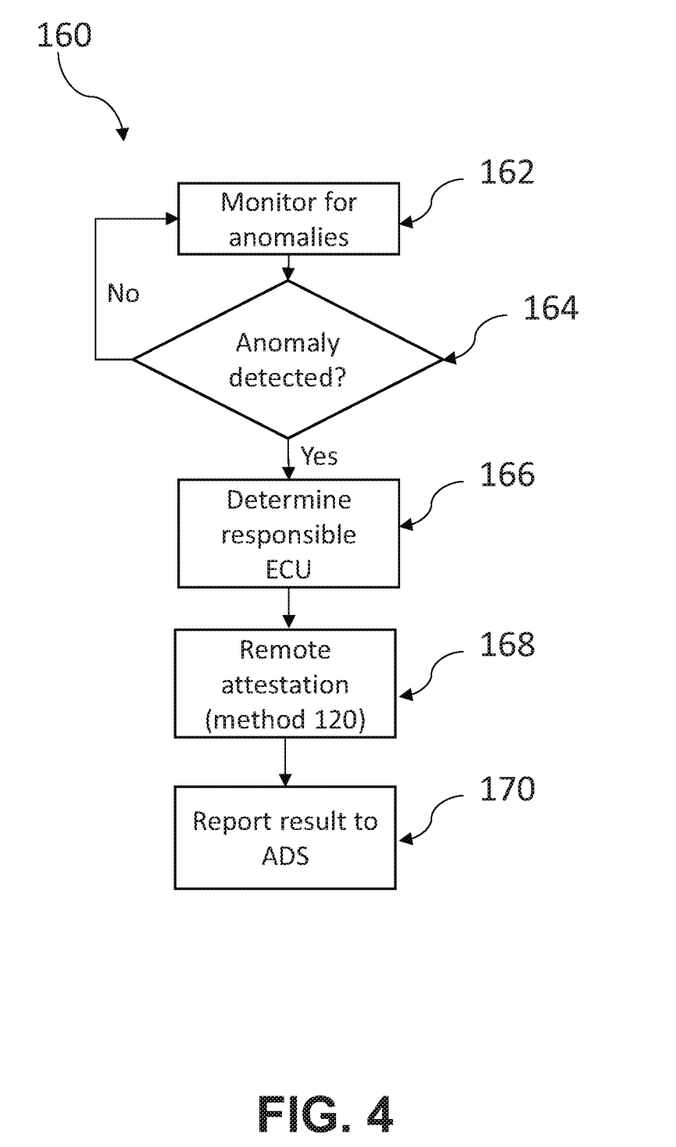
FIG. 4 is a flow diagram of an embodiment of a vehicle communication method, including anomaly detection, according to teachings of the present disclosure.

Referring again to FIG. 1, with embodiments, a vehicle 12 may include an anomaly detection system (ADS) 28. An anomaly detection system 28 may be in communication with and/or may be integrated with an ECU 20. An anomaly detection system 28 may include a processing unit 150 that may include a processor 152 and/or a memory 154. An example of an anomaly detection system 28 is generally described in U.S. patent application Ser. No. 15/589,479, the disclosure of which is hereby incorporated by reference herein in its entirety. In embodiments, such as generally illustrated in FIG. 4, a method 160 of detecting an anomaly via an anomaly detection system 28 may include monitoring for anomalies in a vehicle communication network 10 (step 162). If an anomaly is detected (step 164), the anomaly detection system 28 may determine if an ECU or system (e.g., ECUs 20, 30 or systems 22, 32) is suspected of being responsible for the anomaly (step 166). If an ECU or system is suspected of being responsible for the anomaly, a remote attestation (e.g., method 120) of the suspected ECU or system may be conducted (step 168), such as via a remote processing unit 110 and/or via the ECU 20. If the remote attestation determines that the suspected ECU or system did not successfully complete a secure boot, a processing unit conducting the remote attestation (e.g., an attestation processing unit, such as a main processing unit 40, a main processing unit 90, and/or a remote processing unit 110) may confirm that the suspected ECU or system is responsible for the anomaly. The results of the remote attestation may be transmitted (e.g., from the remote processing unit 110 and/or gateway ECU 20) to the anomaly detection system 28 (step 170) and/or other components.

With embodiments, a vehicle communication network 10 and/or components connected thereto (e.g., ECUs, processing units, etc.) may operate more efficiently and/or more securely than other designs (e.g., may provide improved performance).

In embodiments, processors (e.g., processor(s) 50, 60, 112 etc.) may include an electronic processor, such as a programmable microprocessor and/or microcontroller. In embodiments, processors may include, for example, an application specific integrated circuit (ASIC). Processors may include a central processing unit (CPU), a memory, and/or an input/output (I/O) interface. Processors may be configured to perform various functions, including those described in greater detail herein, with appropriate programming instructions and/or code embodied in software, hardware, and/or other medium. In embodiments, a processor may include a plurality of processors. In embodiments, processors and/or ECUs may be connected to a display, such as a touchscreen display.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

With regard to the processes, systems, methods, heuristics, etc. described herein, it should be understood that, although the steps of such processes, etc. may be described as occurring according to a certain ordered sequence, such processes may be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed as limiting.

It is intended that all matter contained in the above description or shown in the accompanying drawings shall be interpreted as illustrative only and not limiting. Changes in detail or structure may be made without departing from the present disclosure.

It should be understood that an electronic control unit (ECU), a system, and/or a processor as described herein may include a processing apparatus, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having both ROM, RAM, a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute one or more processors, multiple processors that are integrated into a single system or are distributed over and connected together through a communications network, and/or where the network may be wired or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method of communicating via a vehicle communication network, the method comprising:
   providing an electronic control unit (ECU), the ECU including a main processing unit and a security processing unit, the security processing unit including an electronic security processor, a security memory, and a symmetric security key stored in the security memory; wherein the main processing unit includes an electronic main processor and a main memory;
   attempting a secure boot of the main processing unit;
   providing use of the symmetric security key to the main processing unit if the secure boot of the main processing unit is successful;
   preventing use of the symmetric security key by the main processing unit if the secure boot of the main processing unit is not successful;
   conducting, via an attestation processing unit, a remote attestation of the main processing unit; and
   determining, via the attestation processing unit, whether the secure boot of the main processing unit was successful according to the remote attestation;
   wherein conducting the remote attestation includes the attestation processing unit sending a request for a computation using the symmetric security key to the main processing unit, determining that the main processing unit has completed the secure boot if the main processing unit provides a correct result of the computation involving the symmetric security key in response to the request, and determining that the main processing unit is not secure if the main processing unit does not provide the correct result of the computation involving the symmetric security key in response to the request.

2. The method of claim 1, wherein the main processing unit is configured to use services of the security processing unit, and the main processing unit and the security processing unit are configured such that the main processing unit cannot read data directly from the security processing unit.

3. The method of claim 1, wherein the ECU is configured as a gateway ECU.

4. The method of claim 1, providing an anomaly detection system including an anomaly detection processor and anomaly detection memory; and
   providing an outcome of the remote attestation to the anomaly detection system.

5. The method of claim 1, wherein conducting the remote attestation includes the main processing unit attempting to use the symmetric security key; and the security memory includes boot protection.

6. The method of claim 1, wherein providing use of the symmetric security key to the main processing unit does not include providing the symmetric security key to the main processing unit.

7. The method of claim 1, wherein the ECU is disposed in a vehicle, and the attestation processing unit is a remote processing unit disposed outside of the vehicle.

8. The method of claim 1, including providing a second ECU, the second ECU including a second main processing unit and a second security processing unit; wherein the second ECU is configured to control operation of a vehicle system; the second ECU includes a second symmetric security key; the second main processing unit includes a second electronic main processor and second main memory; and the second security processing unit includes a second electronic security processor and a second security memory;

attempting a secure boot of the second main processing unit;

providing use of the second symmetric security key from the second security processing unit to the second main processing unit if the secure boot of the second main processing unit is successful; and preventing use of the second symmetric security key by the second main processing unit if the secure boot of the second main processing unit is not successful.

9. The method of claim 8, wherein conducting the remote attestation includes the attestation processing unit sending a second request for a second computation using the second symmetric security key to the second main processing unit, determining that the second main processing unit has completed the secure boot if the second main processing unit provides a correct result of the second computation involving the second symmetric security key in response to the second request, and determining that the second main processing unit is not secure if the second main processing unit does not provide the correct result of the second computation involving the second symmetric security key in response to the second request.

10. The method of claim 8, including determining, via the ECU, whether the secure boot of the second main processing unit was successful.

11. The method of claim 1, wherein the method does not involve asymmetric security keys.

12. The method of claim 1, wherein the remote attestation does not include communicating the symmetric security key to the attestation processing unit.

13. The method of claim 1, wherein the security processing unit is secure hardware extension compliant.

14. The method of claim 1, including providing a plurality of secondary ECUs, the secondary ECUs each including a secondary main processing unit and a secondary security processing unit associated with the secondary main processing unit; wherein each secondary ECU is configured to control operation of a respective vehicle system of a plurality of vehicle systems; and each secondary ECU includes a respective symmetric security key;

attempting a secure boot of the secondary main processing unit of at least two of the plurality of secondary ECUs;

providing, for each secondary main processing unit that successfully completed the secure boot, use of the respective security key of the associated security processing unit; and preventing, for each secondary main processing unit that failed to successfully complete the secure boot, use of the respective security key of the associated security processing unit wherein each secondary main processing unit includes a respective electronic secondary main processor and secondary main memory; and each secondary security processing unit includes a respective electronic secondary security processor and second security memory.

15. The method of claim 14, wherein the symmetric security key and all of the respective symmetric security keys are different from each other.

16. The method of claim 14, wherein the plurality of vehicle systems includes a brake system, a transmission, and an infotainment system.

17. The method of claim 1, wherein the remote attestation is conducted at least one of periodically and with vehicle start.

18. A vehicle communication network, comprising:

an electronic control unit (ECU) disposed in a vehicle, the ECU including a main processing unit configured for a secure boot, the main processing unit including an electronic main processor and a main memory; and a security processing unit including a security processor, a security memory, and a symmetric security key stored in the security memory, the security processing unit configured to (i) provide use of the symmetric security key to the main processing unit if the secure boot of the main processing unit is successful, and (ii) prevent use of the symmetric security key by the main processing unit if the secure boot of the main processing unit is not successful; and an attestation processing unit including an electronic attestation processor and attestation memory, the attestation processing unit configured to conduct a remote attestation of the main processing unit and configured to determine whether the secure boot of the main processing unit was successful according to the remote attestation;

wherein conducting the remote attestation includes the attestation processing unit sending a request for a computation using the symmetric security key to the main processing unit, determining that the secure boot of the main processing unit was successful if the main processing unit provides a correct result of the computation involving the symmetric security key in response to the request, and determining that the main processing unit is not secure if the main processing unit does not provide the correct result of the computation involving the symmetric security key in response to the request.

19. The vehicle communication network of claim 18, including a plurality of secondary ECUs, the secondary ECUs each including a secondary main processing unit and a secondary security processing unit associated with the secondary main processing unit;

wherein each secondary ECU is configured to control operation of a respective vehicle system of a plurality of vehicle systems;

each secondary security processing unit includes a respective symmetric security key; and each secondary security processing unit is configured to provide use of the respective security key to the secondary main processing unit associated with the secondary security processing unit only if the secondary main processing unit associated with the secondary security processing unit completes a secure boot;

each secondary main processing unit includes a respective electronic secondary main processor and secondary main memory; and each secondary security processing unit includes a respective electronic secondary security processor and second security memory.

20. A method of vehicle communication, the method comprising:

detecting, via an anomaly detection system, that an anomaly is present in a communication network of a vehicle;

determining, via the anomaly detection system, that an electronic control unit (ECU) is responsible for the anomaly, the ECU including a main processing unit and a security processing unit, the security processing unit including an electronic security processor, a security memory, and a symmetric security key stored in the security memory;

attempting a secure boot of the main processing unit after determining that the ECU is responsible for the anomaly;

providing use of the symmetric security key from the security processing unit to the main processing unit if the secure boot of the main processing unit is successful;

preventing use of the symmetric security key by the main processing unit if the secure boot of the main processing unit is not successful;

conducting, via an attestation processing unit, a remote attestation of the main processing unit; and determining, via the attestation processing unit, whether the secure boot of the main processing unit was successful according to the remote attestation;

wherein conducting the remote attestation includes the attestation processing unit sending a request for a computation using the symmetric security key to the main processing unit, determining that the secure boot of the main processing unit was successful if the main processing unit provides a correct result of the computation involving the symmetric security key in response to the request, and determining that the secure boot of the main processing unit was not successful if the main processing unit does not provide the correct result of the computation involving the symmetric security key in response to the request.

* * * * *